R. A. FESSENDEN.
WIRELESS TELEGRAPHY.
APPLICATION FILED FEB. 18, 1909.

1,132,569.

Patented Mar. 23, 1915.
3 SHEETS—SHEET 1.

UNITED STATES PATENT OFFICE.

REGINALD A. FESSENDEN, OF BRANT ROCK, MASSACHUSETTS, ASSIGNOR, BY MESNE ASSIGNMENTS, TO SAMUEL M. KINTNER, OF PITTSBURGH, PENNSYLVANIA, AND HALSEY M. BARRETT, OF BLOOMFIELD, NEW JERSEY, RECEIVERS.

WIRELESS TELEGRAPHY.

1,132,569.     Specification of Letters Patent.     Patented Mar. 23, 1915.

Application filed February 18, 1909. Serial No. 478,593.

*To all whom it may concern:*

Be it known that I, REGINALD A. FESSENDEN, a citizen of the United States, residing at Brant Rock, in the State of Massachusetts, have invented certain new and useful Improvements in Wireless Telegraphy, of which the following is a specification.

My invention relates especially to means for increasing efficiency of apparatus for the transmission and receipt of energy by electromagnetic waves, being especially concerned with improving the antenna; its principal object being to increase the efficiency by obtaining greater efficiency of radiation.

Other advantages will hereinafter appear.

I have illustrated the invention in two simple forms in the accompanying drawings, wherein—

Figure 1:
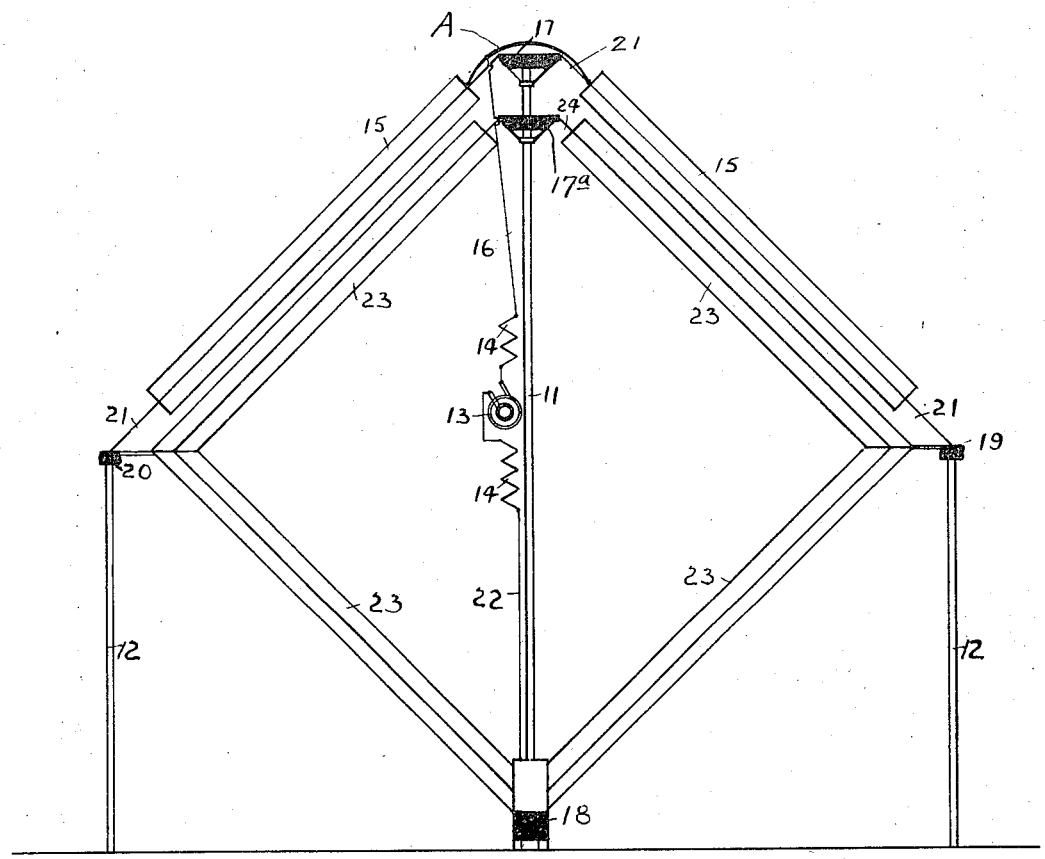
Figure 2:
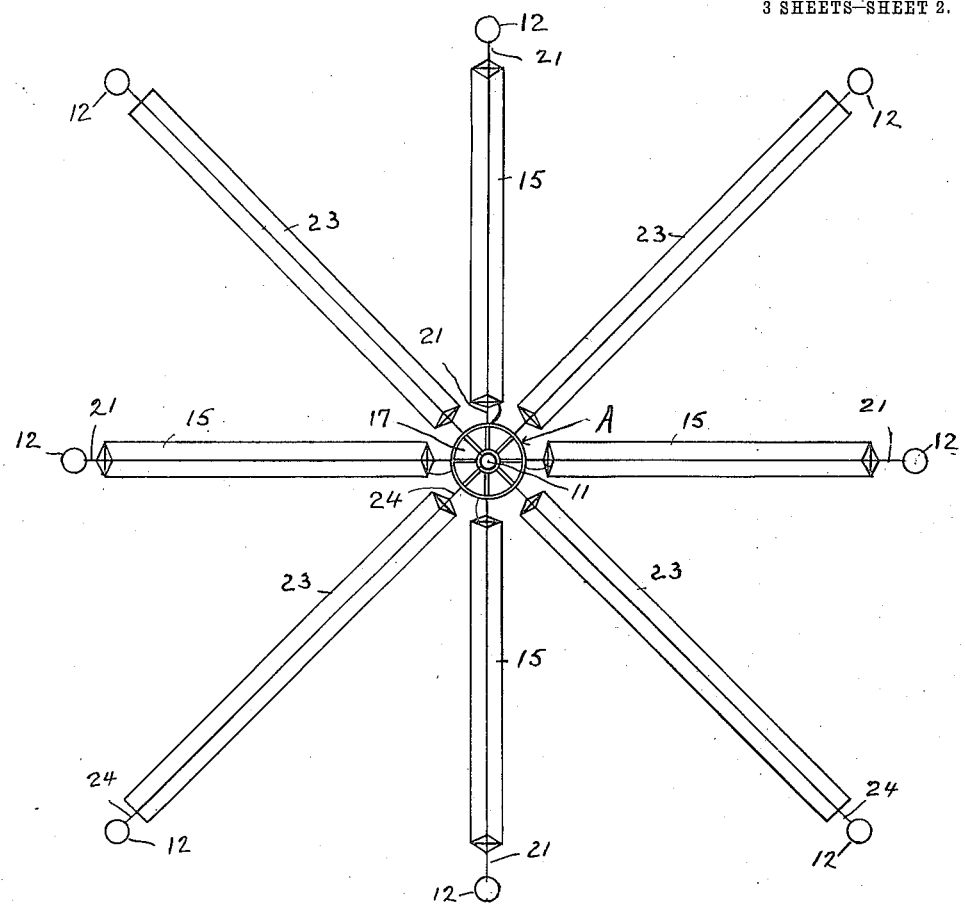
Figure 3:
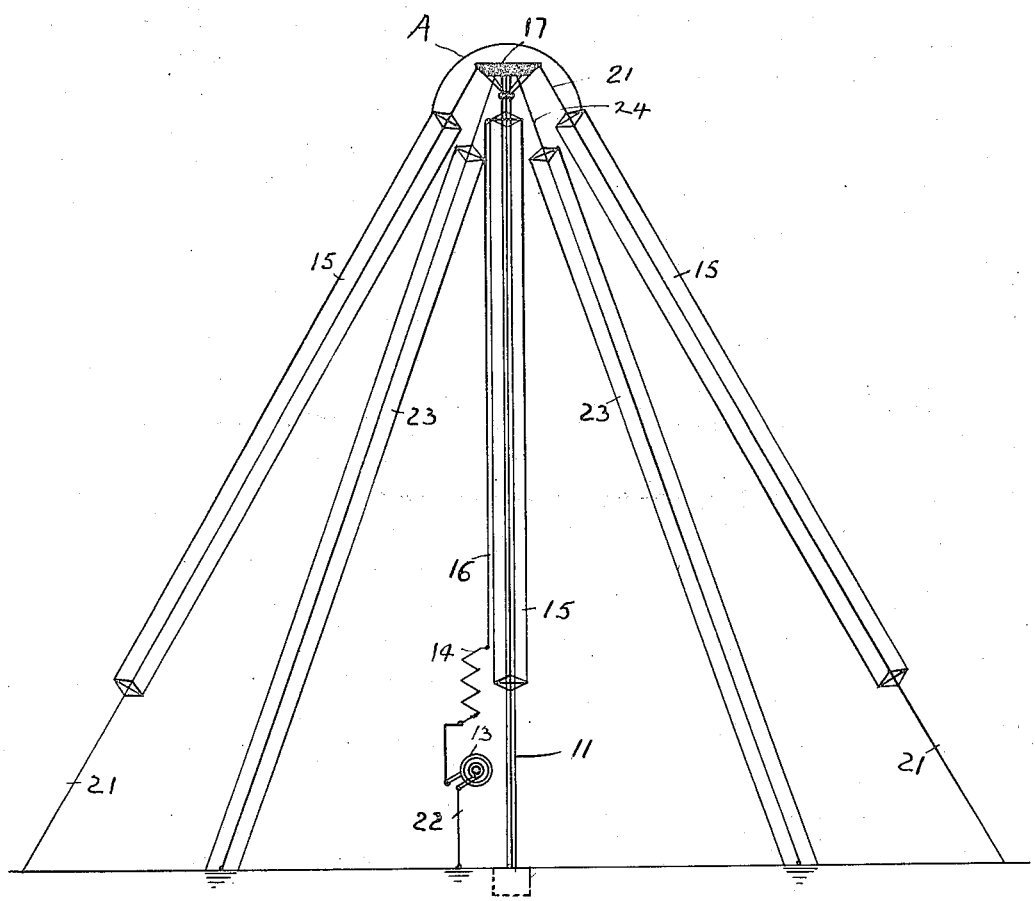

Figure 1 is a diagram representing the invention in side elevation and Fig. 2 is a plan of the same. Fig. 3 represents a side elevation of a modified form.

To more clearly point out the exact nature of the invention, it is necessary to refer somewhat to the history of antennæ. The fact that the elevated antenna of Loomis, Dolbear and Edison, was capable of transmitting signals generated by high frequency oscillations over intervening obstacles was explained by Preece, (*The Electrician* for June 11, 1897), as due to electrostatic effects, and by Marconi, (British Patent No. 12039 of 1896), as transmission through the earth or water; by Blondel as electrostatic surges in a conductor, the antenna forming the two terminals and the earth between them a connecting conductor; and by Taylor as current oscillations in the earth. The applicant in 1898 demonstrated that the signals were produced by a new kind of electromagnetic wave traveling over the surface of the earth, the lower half of the wave being absent and replaced by its image (*Am. Institute of Electric Engineers*, for November, 1899). By means of this theory the applicant was enabled to devise a number of improvements in antennæ. But the exact method in which the waves are radiated from such antennæ has not been heretofore amenable to calculation.

The applicant has discovered that the radiation efficiency of an antenna with respect to the power used depends upon the rate of change of velocity, in a given direction, of the electrons carrying the electrical charge. Also that conductors tangential to spheres circumscribed about the effective center of the radiating structure of the antenna produces no effect on the radiation, but may be used to increase the capacity. This is probably the reason for the efficiency of the horizontal type of antenna. In these antennæ, however, the capacity of the antennæ to ground depends upon the capacity of the horizontal portion with respect to ground, and as the horizontal portion is at some distance above the ground this capacity is necessarily limited.

In some cases the capacity of the antennæ has been increased by the presence of other conductors, but these conductors not being tangential have neutralized the radiation from the main antenna, and so produced a detrimental effect rather than a beneficial one.

Applicant has discovered that by arranging other conductors so that they are grounded, either directly by wire, or indirectly through a capacity, in proximity to the horizontally or tangentially arranged conductors forming the top of the antenna, and arranging said grounded conductors so that they lie on the whole tangentially to the direction of the emitted waves, very highly efficient antennæ, of large radiating capacity, are produced.

In Figs. 1 and 2, 11 represents a central mast which may be built of insulating material, and 12, 12, 12 are similar shorter masts around the circumference of a circle of which 11 is the center. 13 represents a generator of high frequency oscillations, such as the high frequency alternating current dynamo shown, and 14, 14, are tuning inductances in circuit therewith. The top of the antenna is formed by conductors 15, 15, which are connected to the dynamo 13 as by the lead 16, and supported on the mast 11 by insulated support 17, and on masts 12 by insulated supports 19, 20, to which are attached the ropes 21 for holding the conductors. A conductor 22 leads from dynamo 13 to conductors 23, 23, 23, 23, which are fastened to the top of mast 11 at 17ª by ropes 24, and also to the insulated supports 19, 20, and to the bottom of mast 11 by insulated support 18. The conductors 23.

being in proximity to the conductors 15, and the latter having large capacity relative to the other terminal of the dynamo 13, the electrons flowing up from the dynamo 13 through the tuning coil 14 and conductor 16, have their direction suddenly changed at the apex point A and radiate energy off into space. The conductors 15 and 23 do not assist the radiation directly, but add indirectly on account of the large capacity thus obtainable.

As an alternative form the ground level may be placed as shown in Fig. 3, wherein the lower terminal from the dynamo 13 is connected to ground, and the conductors 23, are also grounded, conductors 15 being mounted as before.

Having thus described my invention and illustrated its use, what I claim as new and desire to secure by Letters Patent, is the following:

1. In apparatus for signaling by electromagnetic waves an antenna having an extended upper portion and grounded conductors in proximity to said extended portion arranged in direction so as to increase the capacity of said upper portion, substantially as described.

2. An antenna for wireless signaling comprising an extended radiating or receiving set of conductors and a set of grounded conductors arranged to increase the capacity of said radiating receiving portion, substantially as described.

3. An antenna comprising an extended multiple wire upper portion combined with supplementary conductors in close proximity to same and arranged to increase the capacity of the upper portions.

4. An antenna comprising a set of radially arranged conductors of large capacity, and a supplementary set of radially arranged grounded conductors adapted to increase the capacity of the first set, substantially as described.

5. The combination with an antenna of means for increasing its radiation efficiency comprising auxiliary conductors arranged tangentially to the spherical wave form emitted by the antenna.

6. The combination with a radiating antenna in the form of a series of groups of wires arranged conically around a central support, and auxiliary conductors adapted to increase the radiating efficiency of the antenna, substantially as described.

7. An aerial conductor system for wireless telegraphy, comprising a central support and a tent-shaped group of wires made up of a plurality of sections, each section being individually held by said support at one end and stretched obliquely toward the ground at the other end.

8. An aerial conductor system for wireless telegraphy, comprising a central support and a tent shaped group of wires consisting of a plurality of sections, each section being individually attached at one end to said support and attached to guys connected to the ground at the other end, and insulated both from the support and from the ground, substantially as described.

In testimony whereof I have hereunder signed my name in the presence of the two subscribed witnesses.

REGINALD A. FESSENDEN.

Witnesses:
　JESSIE ETTA BENT,
　FLORENCE MAY LYON.